(12) United States Patent
Thompson et al.

(10) Patent No.: US 11,316,349 B2
(45) Date of Patent: Apr. 26, 2022

(54) RECLOSER CONTROL WITH DISTRIBUTED ENERGY RESOURCE SYNCHRONIZATION

(71) Applicant: Schweitzer Engineering Laboratories, Inc., Pullman, WA (US)

(72) Inventors: Craig Thompson, Palouse, WA (US); Scott M Manson, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 93 days.

(21) Appl. No.: 16/435,830

(22) Filed: Jun. 10, 2019

(65) Prior Publication Data

US 2020/0389032 A1 Dec. 10, 2020

(51) Int. Cl.
*H02J 3/38* (2006.01)
*H02J 3/40* (2006.01)
*H02J 3/48* (2006.01)

(52) U.S. Cl.
CPC ........ *H02J 3/40* (2013.01); *H02J 3/48* (2013.01); *H02J 3/388* (2020.01)

(58) Field of Classification Search
CPC .................. H02J 3/40; H02J 3/48; H02J 3/388
See application file for complete search history.

(56) References Cited

U.S. PATENT DOCUMENTS

| | | | |
|---|---|---|---|
| 6,845,333 B2 | 1/2005 | Anderson | |
| 8,373,309 B2* | 2/2013 | Qin | H02J 3/08 307/85 |
| 9,478,378 B2 | 10/2016 | Kasztenny | |
| 10,153,635 B2* | 12/2018 | O'Brien | H02H 3/353 |
| 10,333,301 B2* | 6/2019 | Gubba Ravikumar | H02J 13/0017 |
| 10,923,907 B2* | 2/2021 | Fan | G01R 31/2836 |

FOREIGN PATENT DOCUMENTS

WO 2013115908 8/2013

* cited by examiner

*Primary Examiner* — Dinh T Le
(74) *Attorney, Agent, or Firm* — Bradley W. Schield (57) ABSTRACT

The present disclosure relates to a recloser control that provides autosynchronization of a microgrid to an area electric power system (EPS). For example, a recloser control may include an output connector that is communicatively coupled to a recloser at a point of common coupling (PCC) between the area EPS and the microgrid. The recloser control may include a processor that acquires a first set of measurements indicating electrical characteristics of the area EPS and acquires a second set of measurements indicating electrical characteristics of the microgrid. The recloser control may send synchronization signals to one or more distributed energy resource (DER) controllers to synchronize one or more DERs to the area EPS based on the first set of measurements and the second set of measurements.

14 Claims, 6 Drawing Sheets

RECLOSER CONTROL WITH DISTRIBUTED ENERGY RESOURCE SYNCHRONIZATION

TECHNICAL FIELD

The present disclosure relates generally to reclosers in electric power systems and, more particularly, to a recloser control that communicates synchronization signals to synchronize distributed energy resources of a microgrid.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems include equipment, such as generators, power lines, transformers, and the like, that provide electrical energy from a source to one or more loads. Some electric power delivery systems may include distributed energy resources (DERs) that provide electrical energy to various loads in the electric power delivery system from distributed locations in the power grid. For example, DERs may provide power in a microgrid connected to an area electric power system (EPS) such that the loads from the microgrid use power from the area EPS and the DERs and/or the DERs provide power to loads on the area EPS. Further, the DERs may be electrically disconnected from the area EPS, also referred to as being islanded.

Some microgrids may have a microgrid controller that sends control signals to the DERs to control operation of the microgrid. In other microgrids, the DER controllers may control operation of the DER without a centralized microgrid controller. In each of these cases, by islanding the microgrid from the area EPS, the DERs may operate independently from the area EPS, for example, to provide power to prioritized loads during an outage on the area EPS.

However, because the DERs operate independently of the area EPS when islanded, the DERs and the area EPS may provide power asynchronously from each other. That is, the DERs may operate at a different voltage, different phase, a different frequency, or any combination thereof, than the power generated on the area EPS. Accordingly, there is a need in the field to synchronize power generation from DERs with power on an area EPS to reconnect the microgrid to the area EPS.

As described below, recloser controls may be electrically connected to a recloser at a point of common coupling (PCC) between DERs on a microgrid and an area EPS. The recloser control may receive measurements of electrical characteristics of the area EPS and measurements of electrical characteristics of the microgrid. The recloser control may determine synchronizing control signals to send to cause synchronization of the DERs with the area EPS to allow the recloser control to close the recloser and reconnect the microgrid to the area EPS.

Figure 1:
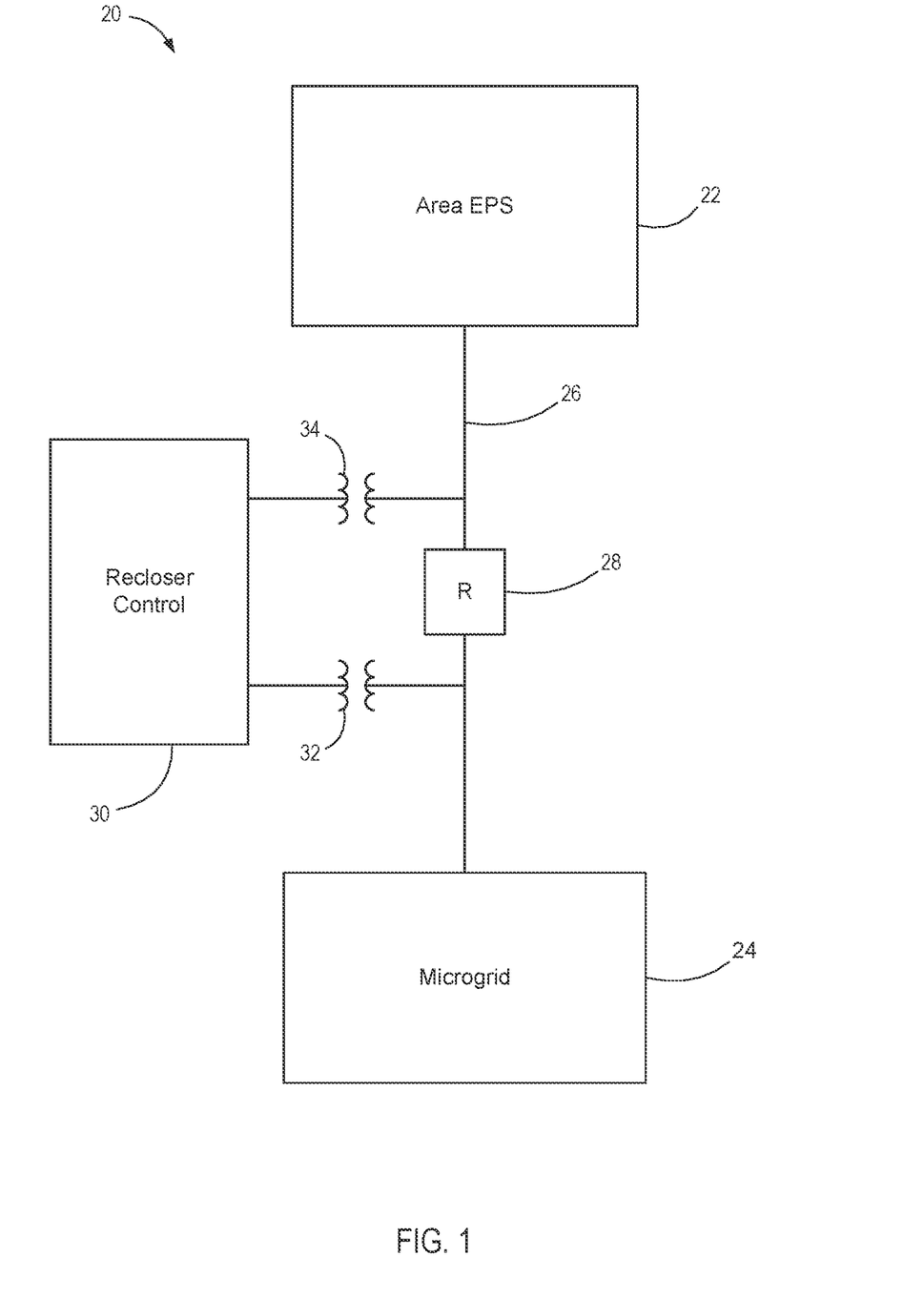
FIG. 1 is a one-line diagram of an electric power delivery system having a recloser control communicatively coupled to a recloser at a point of common coupling (PCC) between a microgrid and an area electric power system (EPS), in accordance with an embodiment.

FIG. 1 illustrates a one-line diagram of an electric power delivery system 20, in accordance with an embodiment. The electric power delivery system 20 includes an area EPS 22, such as a utility power grid, which may have various electric transmission lines, electric distribution lines, current transformers, buses, switches, circuit breakers, reclosers, transformers, autotransformers, tap changers, voltage regulators, capacitor banks, generators, motors, pumps, compressors, valves, and a variety of other types of monitored equipment. The area EPS 22 is electrically connected to a microgrid 24 via a first power line 26. The microgrid 24 may include various electrical equipment, such as those described above with respect to the area EPS 22.

At a PCC, a recloser 28 may selectively connect the microgrid 24 to the area EPS 22. For instance, the recloser 46 may be located on an overhead power distribution line that enters the microgrid 24. The electric power delivery system 20 further includes a recloser control 30 communicatively coupled to the recloser 28 to send control signals to the recloser 28.

In the illustrated embodiment, the recloser control 30 may include a first potential transformer (PT) 32 coupled between the recloser 28 and the microgrid 24 and a second PT 34 coupled between the recloser 28 and the area EPS 22. The recloser control 30 may receive a signal indicating the voltage on the power line 26 between the recloser 28 and the area EPS 22 via the potential transformer 34, and receive a signal indicating the voltage on the power line 26 between the recloser 28 and the microgrid 24 via the potential transformer 32.

The recloser control 30 may detect events on the power line 26 based on the voltage signals (e.g., via the PTs 32 and 34), current signals, and the like. For instance, a transient fault may occur on the overhead power distribution line of the recloser 28. The recloser control 30 may detect a transient event (e.g., overcurrent event, undercurrent event, overvoltage event, undervoltage event, etc.) and send a signal to the recloser 28 to open (i.e., trip) the recloser 28 and to subsequently close the recloser 28. For example, the recloser control 30 may be set to close the recloser 28 after a predetermined period of time to allow a transient fault to resolve. Further, the recloser control 30 may attempt to close and open a set amount of times prior to lock out in which the recloser remains in the open position, for example, until a user or another device communicates to the recloser control 30 to close. By opening and closing the recloser 30 a set amount of times prior to lock out, the recloser control 30 may protect the electric power delivery system 20 from transient events while continuing to provide power subsequent to the transient event.

As explained above, the microgrid 24 may be islanded such that the microgrid 24 is disconnected from the area EPS 22, for example, due to an event in the microgrid 24 or the area EPS 22. For instance, the microgrid 24 may be electrically disconnected from the area EPS 22 due to a fault on the power line 26. While disconnected, the microgrid 24 and the area EPS 22 may operate independently of each other.

Figure 2:
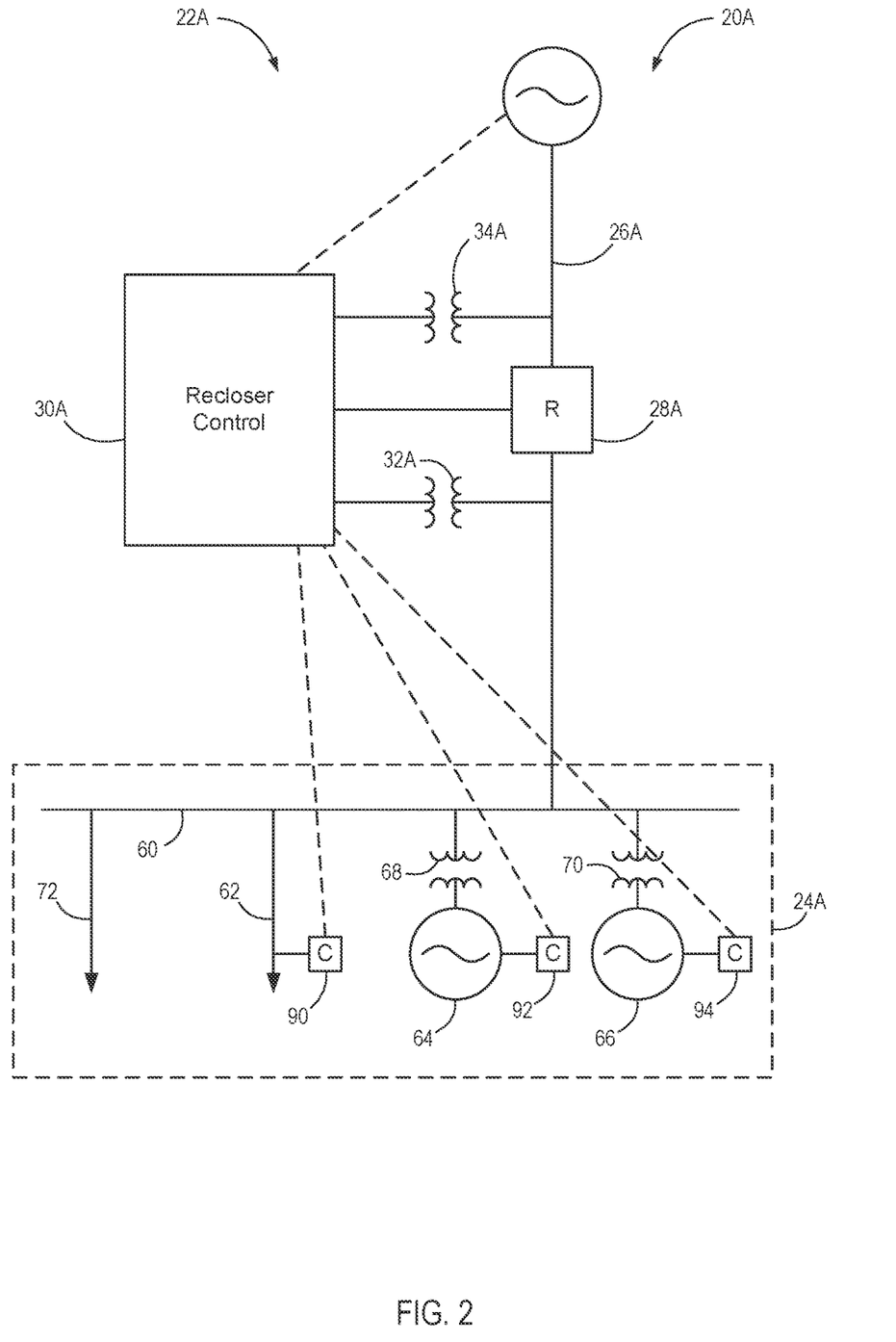
FIG. 2 is a one-line diagram of an example of the electric power delivery system of FIG. 1 in which the recloser control communicates with distributed energy resources (DERs) of the microgrid, in accordance with an embodiment.

FIG. 2 is an example of an embodiment of the electric power delivery system 20 of FIG. 1 with a particular configuration of a microgrid 24A, in accordance with an embodiment. As illustrated, the microgrid 24 includes distributed energy resources (DERs), such as one or more controllable loads 62, a first distributed generator 64, and a second distributed generator 66, each connected to a bus 60. The generators 64 and 66 are connected to the bus 60 via respective potential transformers (PTs) 68 and 70 and may provide electrical power to the loads 62 and 72.

In the illustrated embodiment, the controllable load 62, the first distributed generator 64, and the second distributed generator 66 may be controlled via respective DER controllers 90, 92, and 94. For example, the DER controller 92 of the generator 64 may monitor voltages of the microgrid 24 and regulate the flow of fuel and other controls of the generator 64 based on the microgrid 24. Further, the DERs may be electrically coupled to the area EPS 22A via the power lines 26A to receive power generated on the area EPS 22A or to supply power to loads on the area EPS 22A.

Figure 3:
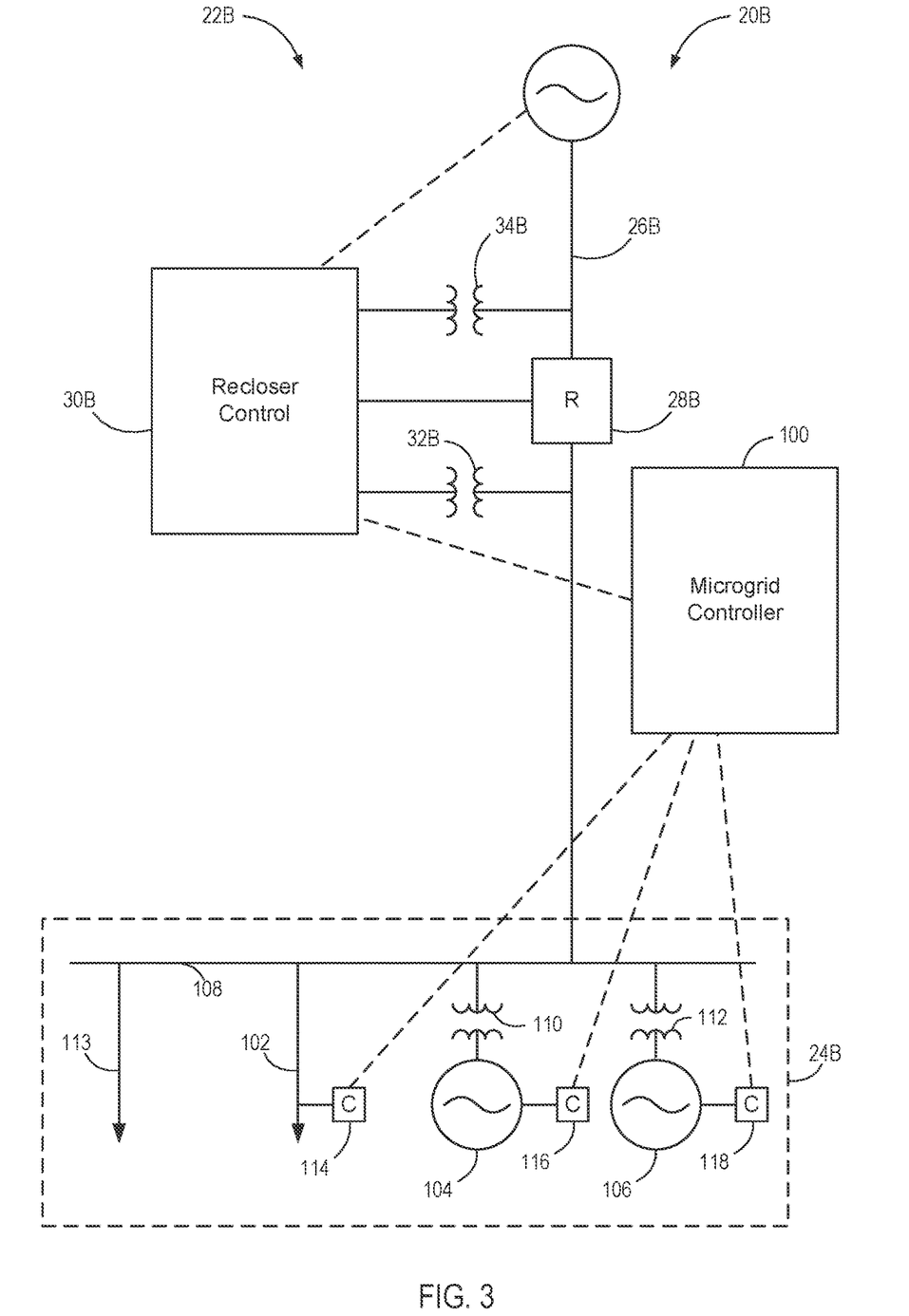
FIG. 3 is a one-line diagram of an example of the electric power delivery system of FIG. 1 in which the recloser control communicates with a microgrid controller, in accordance with an embodiment.

FIG. 3 is a one-line diagram of an example of the electric power delivery system 20 of FIG. 1 with another configuration of a microgrid 24B, in accordance with an embodiment. Similar to FIG. 2, the microgrid 24B includes DERs, such as one or more controllable loads 102, a first distributed generator 104, and a second distributed generator 106, each connected to a bus 108. The generators 104 and 106 are connected to the bus 108 via respective potential transformers (PTs) 110 and 112 and may provide electrical power to the loads 102 and 113.

As illustrated in FIG. 3, the microgrid 24 is controlled and/or managed by a microgrid controller 100. For example, the microgrid controller 100 may be embodied as an SEL-3555 real-time automation controller from Schweitzer Engineering Laboratories, Inc., located in Pullman, Washington. The microgrid controller 100 may receive voltage and current measurements from various electronic devices in the electric power delivery system 20, such as voltage measurements from the recloser control 30 and/or the DER controllers. The microgrid controller 100 may send control signals to the DER controllers 114, 116, and 118 of the controllable load 102, the first distributed generators 104, and the second distributed generator 106 to control operation of the microgrid 24B such that the controllable loads 62 and the generators 64 and 66 maintain a desired frequency and voltage.

For instance, if frequency in the microgrid 24B is decreasing, the microgrid controller 100 may send a control signal to the controller 116 of the generator 104 to increase the supply of fuel to the generator 104, thereby increasing the frequency. In such control systems, the microgrid controller 100 may efficiently deliver control signals to optimize the operation of the microgrid 24B. As mentioned above, the recloser 28B may be opened between the area EPS 22B and the microgrid 24B resulting in an islanded microgrid 24B that operates independently from the area EPS 22B.

Figure 4:
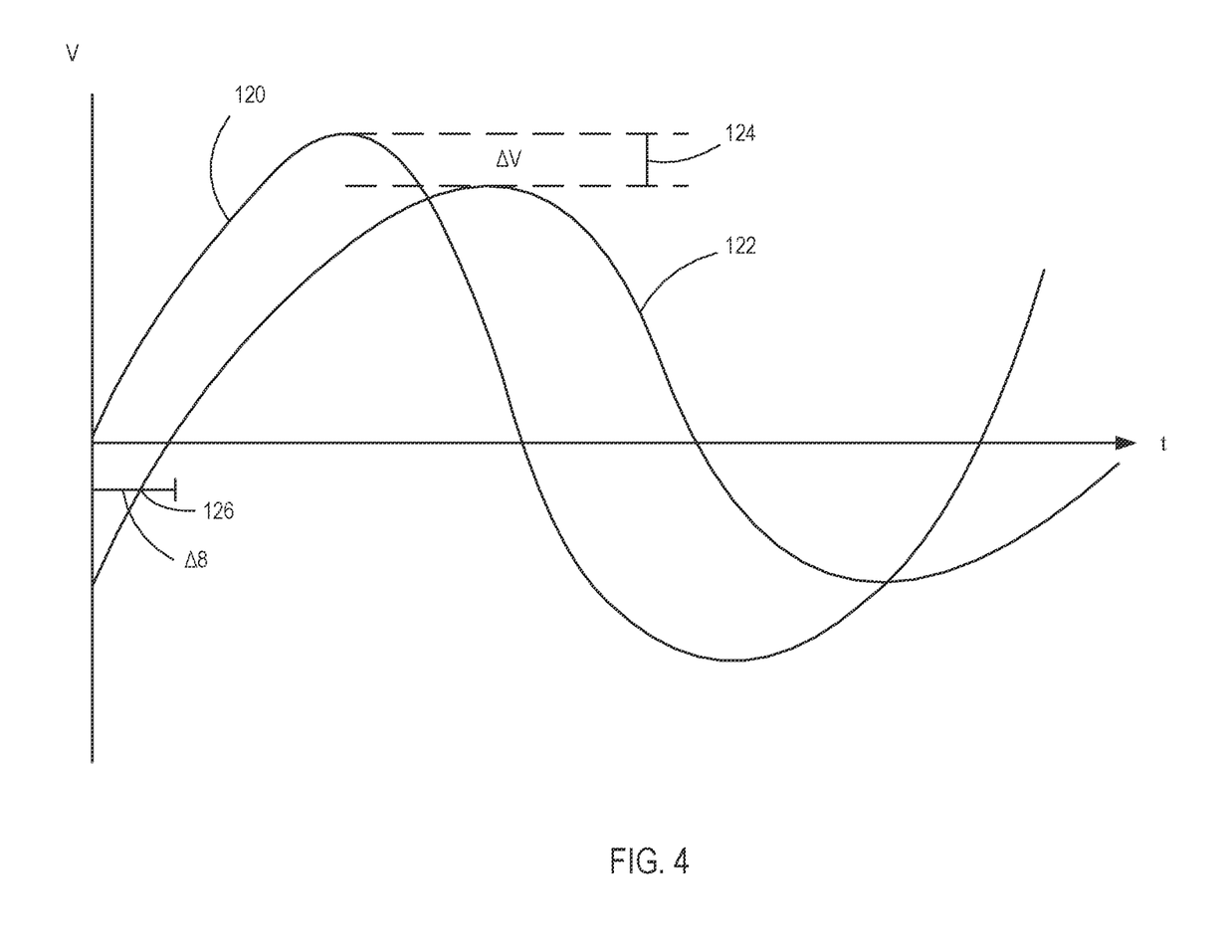
FIG. 4 is a plot of a voltage signal of the microgrid to be synchronized with a voltage signal of the area EPS via the recloser control at the PCC, in accordance with an embodiment.

FIG. 4 is a plot of area EPS voltages 120 and microgrid voltages 122 with respect to time, in accordance with an embodiment. The area EPS voltages 120 may operate at a different magnitude ($\Delta V$ 124), a different phase ($\Delta \delta$ 126), a different frequency, or any combination thereof, than the microgrid voltages 122. Prior to reclosing the recloser 28 and reconnecting the microgrid 24 to the area EPS 22, the microgrid voltages 122 may be synchronized to the area EPS voltages 120.

Figure 5:
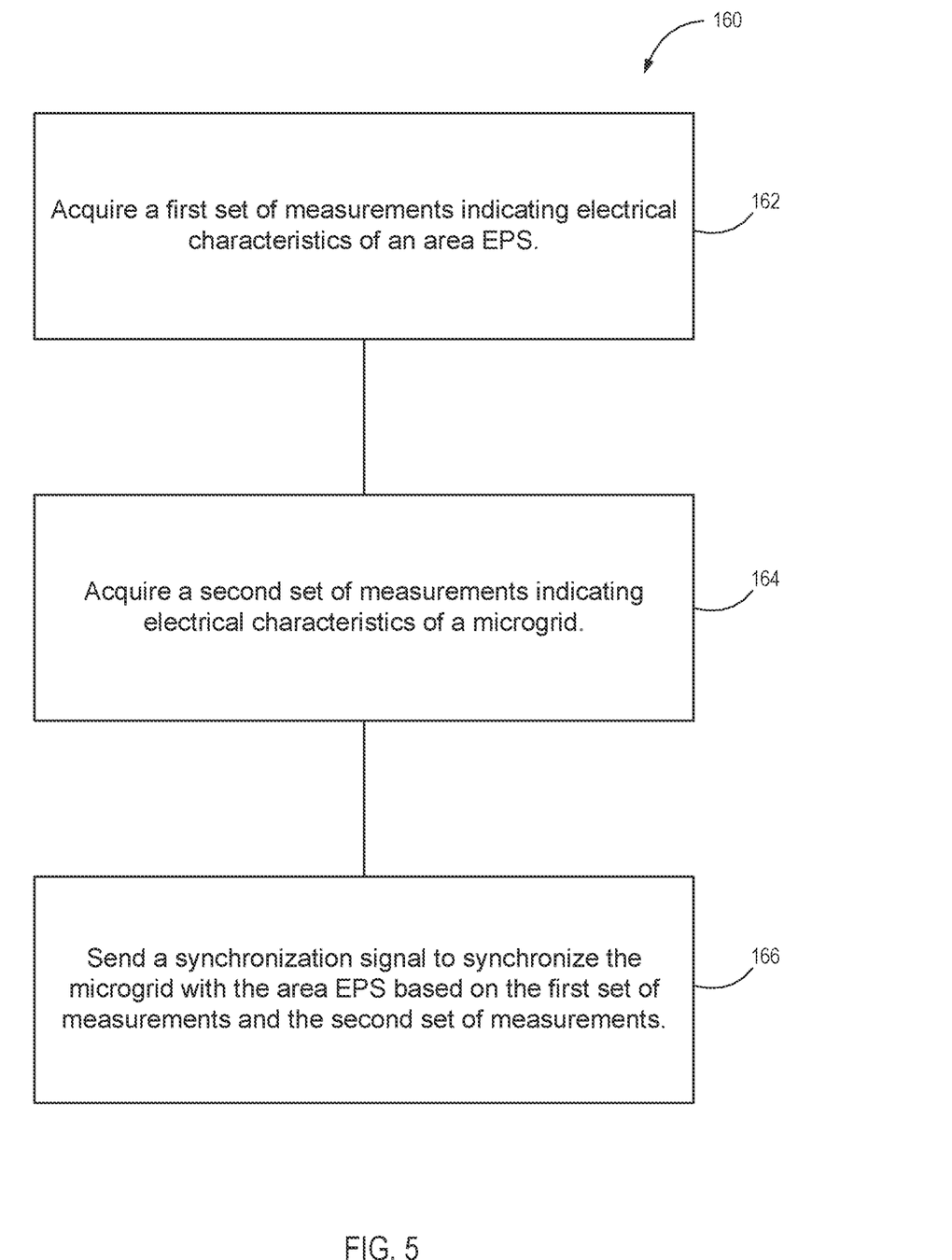
FIG. 5 is a flow diagram of process that may be performed by the recloser control of FIG. 1 to synchronize the DERs of the microgrid to the area EPS, in accordance with an embodiment.

FIG. 5 is a flow chart of a process 160 that may be performed by the recloser control 30 to synchronize the microgrid voltages to the area EPS voltages, in accordance with an embodiment. This process 160 may be performed while the recloser 28 is open and the microgrid 24A is islanded. The process 160 may begin by the recloser control 30 acquiring a first set of measurements indicating electrical characteristics of an area EPS 22 (block 162). As mentioned above, the first set of measurements may be voltage measurements acquired via the potential transformer 82.

The recloser control 30 may acquire a second set of measurements indicating electrical characteristics of a microgrid (block 164). In some embodiments, the second set of measurements may be voltage measurements acquired via the potential transformer 80. In other embodiments, the second set of measurements may be acquired by the recloser control 30 via communication from one or more DER controllers.

The recloser control 30 may send a synchronization signal to synchronize the microgrid with the area EPS 22 based on the first set of measurements and the second set of measurements. For example, referring to FIG. 2, the recloser control 30A may send the synchronization signal to one or more DER controllers (e.g., load controller 90, first generator controller 92, second generator controller 94, or any combination thereof) to synchronize the one or more DERs (e.g., load 62, first distributed generator 64, second distributed generator 66) to the area EPS 22A based on the first set of measurements and the second set of measurements. That is, the recloser control 30A may send one or more synchronization signal(s) that indicate the voltage magnitude difference 124, the phase difference 126, the frequency difference, or any combination thereof. The synchronization signal(s) may be pulse width signal(s) having a pulse width that is of a width corresponding to (e.g., matching in length) the voltage magnitude difference 124, the phase difference 126, or the frequency difference. By providing these differences 124 and 126 to the DER controllers, the voltage characteristics of the microgrid 24 may be synchronized to the voltage characteristics of the area EPS 22A. For instance, the distributed generator controllers 92 and 94 may increase fuel/decrease to the generators to reduce the phase and/or frequency differences between the microgrid 24 and the area EPS 26.

In other embodiments, the recloser control 30 may send a synchronization signal to synchronize the microgrid controller to allow the microgrid controller to synchronize the one or more DERs to the area EPS 22. For example, the recloser control 30 may send synchronization signal(s) that indicate the voltage magnitude difference 124, the phase difference 126, the frequency difference, or any combination thereof, to the microgrid controller 100. The synchronization signal(s) may be pulse width signal(s) having a pulse width that is of a width corresponding to (e.g., matching in length) the voltage magnitude difference 124, the phase difference 126, or the frequency difference.

The microgrid controller 100 may determine optimal control of the DERs 62, 64, and 66 to synchronize the microgrid 24B to the area EPS 22B. For instance, the recloser control 30 may send a synchronization signal indicating the phase difference 126 to the microgrid controller 100. Based on the phase difference 126, the microgrid controller 100 may send control signals to generator controller 92 to adjust the phase of the microgrid 24B to align with the phase of the area EPS 22B.

In some embodiments, the recloser control 30 may determine whether the first set of measurements and the second set of measurements are within a window of each other. The recloser control 30 may send a signal to the recloser 28 to close the recloser 28 upon determining that the first set of measurements and the second set of measurements are within the window. In some embodiments, the windows may be set by a user that configures the size of the difference between the microgrid and the macrogrid in which the voltages are considered synchronized. For example, the recloser control 30 may determine that the voltage magnitude of the area EPS 22 and the voltage magnitude of the microgrid 24 are within a voltage magnitude tolerance, the phase difference between the area EPS 22 and the microgrid 24 are within a phase difference tolerance, and the frequency of the area EPS 22 and the microgrid 24 are within a frequency tolerance. Upon synchronizing the microgrid to the area EPS 22 and the microgrid 24 via the DER controllers and/or the microgrid controller, the recloser control 30 may reconnect the area EPS 22 with the microgrid 24 via closing of the recloser 28 which may allow the microgrid 24 to receive power from or provide power to the area EPS 22.

Figure 6:
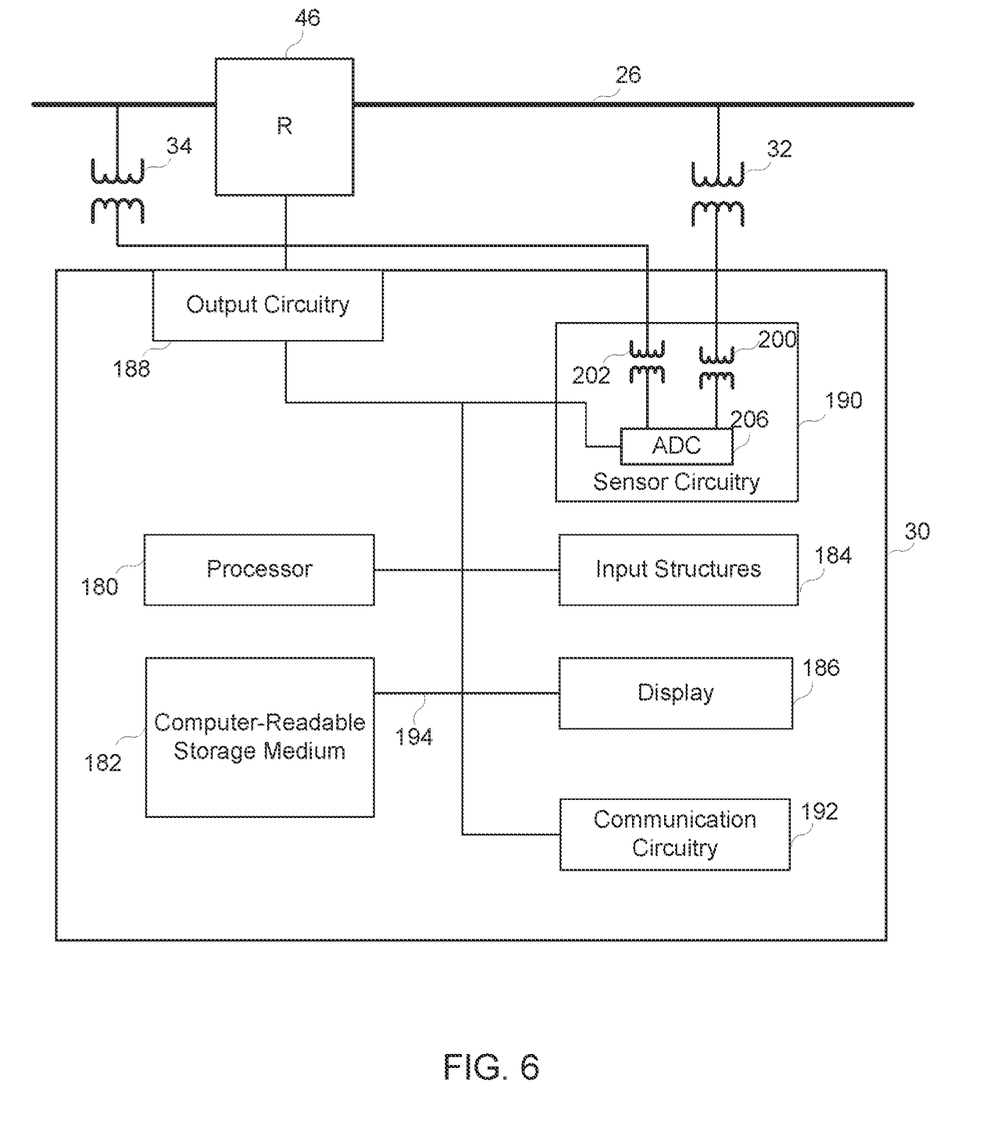
FIG. 6 is a block diagram of a recloser control in the electric power delivery system of FIG. 1, in accordance with an embodiment.

FIG. 6 is a block diagram of an embodiment of the recloser control 30 that may be used to synchronize the microgrid 24 (e.g., via the DER controllers or a microgrid controller) with the area EPS 22. In the illustrated embodiment, the recloser control 30 includes a processor 180, a computer-readable storage medium 182, input structures 184, a display 186, output circuitry 188, sensor circuitry 190, and communication circuitry 192.

The recloser control 30 may include one or more bus(es) 194 connecting the processor 180 or processing unit(s) to the computer-readable storage medium 182, the input structures 184, the display 186, the output circuitry 188, and/or the sensor circuitry 192. The computer-readable storage medium 182 be embodied as memory, such as random access memory (RAM), read only memory (ROM), or a combination thereof, and may include or interface with software, hardware, or firmware modules for implementing various portions of the systems and methods described herein. The computer-readable storage medium 184 may be the repository of one or more modules and/or executable instructions configured to implement any of the processes described herein.

The processor 180 may process inputs received via the sensor circuitry 192 and the communication circuitry 192. The processor 180 may operate using any number of processing rates and architectures. The processor 180 may be configured to perform various algorithms and calculations described herein (e.g., process 160) using computer executable instructions stored on computer-readable storage medium 182. The processor 180 may be embodied as a microprocessor. In certain embodiments, the processor 180 and/or the computer-readable storage medium 182 may be embodied as discrete electrical components, a general purpose integrated circuit, one or more Application Specific Integrated Circuits ("ASICs"), a Field Programmable Gate Array ("FPGA"), and/or other programmable logic devices. The processor 180 and/or the computer-readable storage medium 182 may be referred to generally as processing circuitry.

The sensor circuitry 190 may include voltage sensor circuitry, such as the PTs 32 and 34. The sensor circuitry 190 may receive voltage signals from the PTs 32 and 34 52 and transform the signals using the potential transformer(s) 200 and 202 to a level that may be sampled, and sample the signals using, for example, A/D converter(s) 206 to produce digital signals representative of measured voltage on the power line 26. Similar values may also be received from other distributed controllers, station controllers, regional controllers, or centralized controllers. The values may be in a digital format or other format. In certain embodiments, the sensor circuitry 190 may be utilized to monitor current and/or voltage signals associated with a portion of an electric power delivery system 20. Further, the sensor circuitry 190 may monitor a wide range of characteristics associated with monitored equipment, including equipment status, temperature, frequency, pressure, density, infrared absorption, radio-frequency information, partial pressures, viscosity, speed, rotational velocity, mass, switch status, valve status, circuit breaker status, tap status, meter readings, conductor sag and the like.

The A/D converter 206 may be connected to the processor 180 by way of the bus 194, through which digitized representations of voltage signals may be transmitted to the processor 180. The processor 180 may be used to monitor and/or protect portions of the electric power delivery system 20, and issue control signals (e.g., synchronization signals) in response to the same.

The output circuitry 188 may include one or more output connectors (e.g., output contacts) that electrically connect the recloser control 30 to the recloser 28 to allow the processor 180 to send control signals to the recloser 28. For example, the output circuitry 188 may convert bus signals from the processor 180 to a voltage and/or current to open or close the recloser 28.

The communication circuitry 192 may include, for example, a wireless transceiver that communicates with one or more other IEDs, a central monitoring station, and the like. The recloser control 30 may include a display screen 186 that displays information to notify an operator of events on the electric power delivery system 20, such as islanding of the microgrid 24. In certain embodiments, the processor 180 may effect a control operation on the electric power delivery system 20 via the output circuitry 188, as described above. For example, the processor 180 may send a signal to open the recloser 28 upon detecting islanding of the microgrid 24 to disconnect the power line 26 between the PCC and the area EPS 30 at the PCC. Further, the processor 180 may send, via the communication circuitry 192, the synchronization signal(s) indicating the voltage difference, the phase difference, the frequency difference, or any combination thereof, to the microgrid controller or the DER controllers. Upon synchronizing the microgrid 24 to the area EPS 22, the processor 180 may send, via the output connectors, a close signal to close the recloser to allow the microgrid 24 to be reconnected to the area EPS 22.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A recloser control, comprising:
   an output connector configured to be communicatively coupled to a recloser at a point of common coupling between an area electric power system (EPS) in an electric power delivery system and a microgrid;
   a memory; and
   one or more processors operatively coupled to the memory, wherein the one or more processors are configured to:
      acquire, via a first electrical sensor, a first set of measurements indicating first electrical characteristics of the area EPS;
      acquire, via a second electrical sensor, a second set of measurements indicating second electrical characteristics of the microgrid; and
      send a synchronization signal to one or more distributed energy resource (DER) controllers of the microgrid indicating a difference between the first set of measurements and the second set of measurements to allow the one or more DER controllers to perform control operations to adjust operation of the one or more DERs to reduce the difference between the first electrical characteristics and the second electrical characteristics to synchronize operation of the one or more DERs of the microgrid to the area EPS.

2. The recloser control of claim 1, wherein the one or more processors are configured to:
   determine that the first set of measurements and the second set of measurements are within a window of each other; and
   send a signal, via the output connector, to the recloser to close the recloser upon determining that the first set of measurements and the second set of measurements are within the window.

3. The recloser control of claim 1, wherein the first sensor is a first potential transformer, wherein the first potential transformer is configured to be communicatively coupled between the recloser and the area EPS to allow the processor to acquire, via an analog-to-digital converter of the recloser control, the first set of measurements indicating the first electrical characteristics of the area EPS, wherein the second sensor is a second potential transformer configured to be communicatively coupled between the recloser and the microgrid to allow the recloser control to acquire, via the analog-to-digital converter, the second set of measurements indicating the second electrical characteristics of the microgrid while the microgrid is islanded from the area EPS.

4. The recloser control of claim 1, wherein the difference is a phase difference between voltages of the area EPS and voltages of the one or more DERs.

5. The recloser control of claim 1, wherein the one or more DERs comprise a generator, wherein the synchronization signal is configured to adjust the frequency, the phase, the magnitude, or any combination thereof, of voltages produced by the generator to synchronize the generator with the area EPS.

6. The recloser control of claim 1, wherein the one or more processors are configured to send the synchronization signal directly to the one or more DER controllers.

7. The recloser of claim 1, wherein the synchronization signal comprises a pulse width signal having a width proportional to a phase difference between the microgrid and the area EPS.

8. The recloser of claim 1, wherein the difference is a frequency difference, and wherein the processor is configured to send the synchronization signal comprising an indication of the frequency difference to allow the one or more DER controllers to increase the frequency or decrease the frequency of the one or more DERs in the microgrid.

9. The recloser of claim 1, wherein the difference is a voltage difference, wherein the processor is configured to send the synchronization signal comprising an indication of the voltage difference to allow the one or more DER controllers to raise the voltage or to lower the voltage of the one or more DERs in the microgrid.

10. A non-transitory, computer readable medium comprising instructions that, when executed by a processor, cause operations comprising:
    acquiring, via a first electrical sensor, a first set of measurements indicating first electrical characteristics of an area electric power system (EPS) in an electric power delivery system;
    acquiring, via a second electrical sensor, a second set of measurements indicating second electrical characteristics of one or more distributed energy resources (DERs) of a microgrid in the electric power delivery system; and
    sending a synchronization signal to one or more DER controllers of the microgrid indicating a difference between the first set of measurements and the second set of measurements to allow the one or more DER controllers to perform control operations to adjust operation of the one or more DERs to reduce the difference between the first electrical characteristics and the second electrical characteristics to synchronize operation of the one or more DERs to the area EPS.

11. The non-transitory, computer readable medium of claim 10, comprising instructions that, when executed by a processor, cause operations comprising:
    upon sending the synchronization signal, determine that the first set of measurements and the second set of measurements are within a window of each other; and
    send a signal to close the recloser upon determining that the first set of measurements and the second set of measurements are within the window.

12. The non-transitory, computer readable medium of claim 10, wherein the first set of measurements comprise a frequency, a phase, and a magnitude of the area EPS, and wherein the second set of measurements comprise a frequency, a phase, and a magnitude of the microgrid.

13. The non-transitory, computer readable medium of claim 10, comprising instructions that, when executed by a processor, cause operations comprising sending the synchronization signal to the one or more DER controllers having a pulse width corresponding to a voltage difference between a voltage of the area EPS voltage and a voltage of the one or more DERs.

14. The non-transitory, computer readable medium of claim 10, comprising instructions that, when executed by a processor, cause the processor to perform operations comprising determining a phase difference between voltages of the area EPS and voltages of the microgrid.

\* \* \* \* \*